CENTER PLATE ASSEMBLY

Original Filed July 8, 1968 2 Sheets-Sheet 1

INVENTORS
CHARLES W. ARTZER
ALEXANDER M. DiCICCO
BY
ATTORNEY

CENTER PLATE ASSEMBLY

Original Filed July 8, 1968 2 Sheets-Sheet 2

INVENTORS
CHARLES W. ARTZER
ALEXANDER M. DiCICCO
BY
ATTORNEY

United States Patent Office

Re. 27,651
Reissued May 29, 1973

27,651
CENTER PLATE ASSEMBLY

Charles W. Artzer, 631 Freeman St. 66616, and Alexander M. Di Cicco, 1120 W. 31st St. 66611, both of Topeka, Kans.

Original No. 3,510,180, dated May 5, 1970, Ser. No. 743,097, July 8, 1968. Application for reissue Oct. 19, 1971, Ser. No. 190,542
Int. Cl. F16c *17/00*
U.S. Cl. 308—137 5 Claims

Matter enclosed in heavy brackets [ ] appears in the original patent but forms no part of this reissue specification; matter printed in italics indicates the additions made by reissue.

ABSTRACT OF THE DISCLOSURE

Structure surrounding the king pin of a railway vehicle supporting an end of the car body on a truck bolster and accommodating relative rotation of the truck bolster relative to the vehicle body. The structure insures prolonged lubrication of the center plate assembly and the structural arrangement reduces relative lateral and longitudinal movements of the interfitting plates and reduces shock that would otherwise be transmitted to the bearings, wheels and the track.

The present invention relates to the underframe construction of a railway car and the invention more specifically pertains to an improved construction of the center plate assembly.

The prior art includes numerous center plate designs and one arrangement that is in use includes a body center plate having a depending projection which is accommodated in a generally cup-shaped recess in the truck bolster. Such an assembly has horizontal bearing surfaces which allows movement between the body center plate and the truck center plate. Such movement develops wear and permits shocks to be transmitted through the truck assembly to the bearings and the wheels and the rails. The annular flange on the bolster which defines the perimeter of the recess suffers wear and damage from the relative movements of the center plate elements. The recess traps foreign matter and makes lubrication of the center plate assembly difficult, promoting further wear allowing additional movement of the body relative to the bolster. Such movement contributes to an increase in the shock transmittal which may cause lading damage. Lubricating pads or greases can not be retained in the presence of the bearing surfaces of the center plates for any extended period.

An object of the present invention is to provide a center-plate assembly wherein the load supporting surface of the truck center plate is in the form of a male element which is accommodated in a recess in the body center plate and with the mating surfaces of conical formation insuring fitting of the wearing surfaces and virtually eliminating the possibility of relative horizontal movements of the two elements of the center plate assembly.

Another object of the invention is to provide an upwardly projecting bearing surface on the truck center plate which is encased by complementary undersurface on a body center plate and to provide recesses in the truck center plate for receiving lubricating material which is shielded and protected and as the lubricating material is displaced it travels downwardly between the mating surfaces to maintain prolonged lubricating of the center plate assembly.

A further object of the invention is to provide means for detachably securing the center plates in assembled relationship to thereby avoid vertical slapping and the transmission of such impacts to the body and to the wheels.

Other objects and features of the invention will be appreciated and become apparent to those skilled in the art to which the invention pertains as the present disclosure proceeds and upon consideration of the annexed drawings taken in conjunction with the following detailed description wherein an embodiment of the invention is disclosed.

Figure 3:
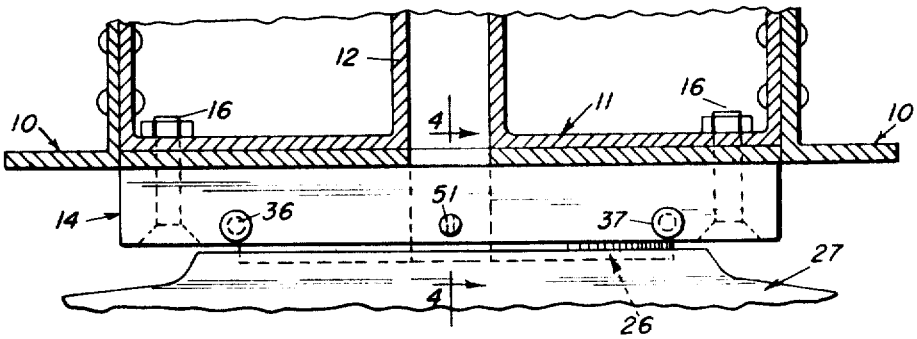
FIG. 3 is an end elevational view showing the assembly in relation to one type of center sill and center post and a truck bolster.

The invention is directed to the structure adjacent the center post of a railway car where it is supported on the truck bolster for relative rotation of the vehicle body with respect to the truck bolster about the axis of the king pin. A portion of one type of center sill structure is shown at 10 in FIG. 3 and the underframe of the railway vehicle in this area is usually reinforced by a center post 11. The center post is provided with a vertically disposed tubular member 12 for receiving the king pin. In a cener plate assembly in general use a male element secured to the center filler casting depends into a cup-shaped recess formed in the truck bolster around the opening for the king pin.

Figure 1:
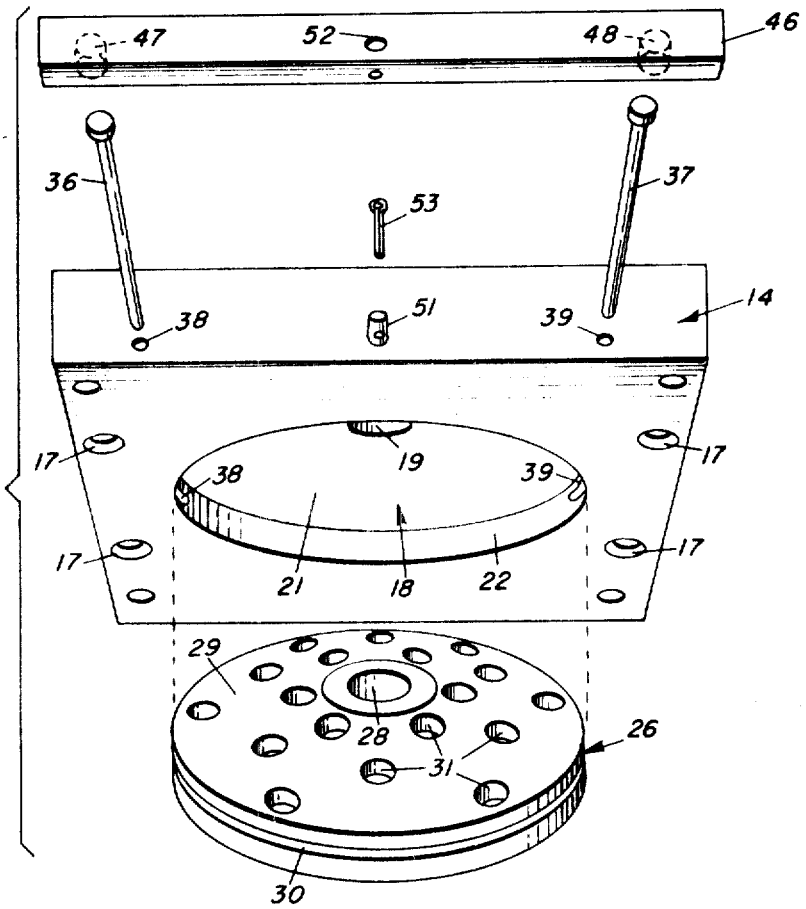
FIG. 1 is an exploded perspective view of a center plate organization embodying the invention.
Figure 2:
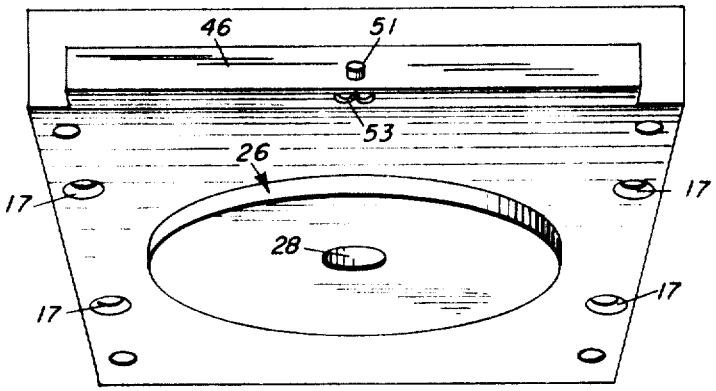
FIG. 2 is a perspective view showing the elements illustrated in FIG. 1 in assembled relationship.
Figure 4:
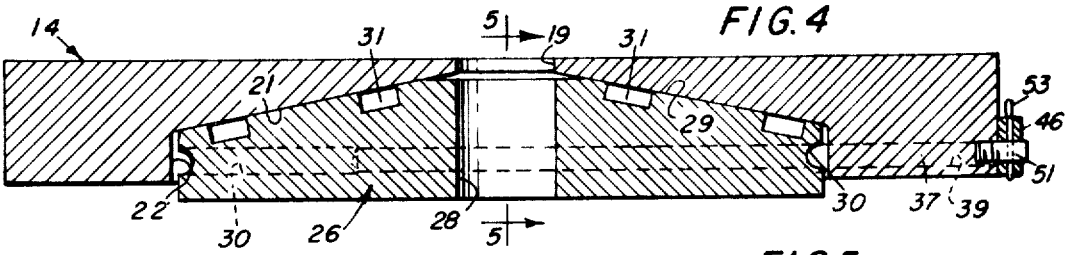
FIG. 4 is a sectional view on a larger scale and taken on the line 4—4 of FIG. 3.
Figure 6:
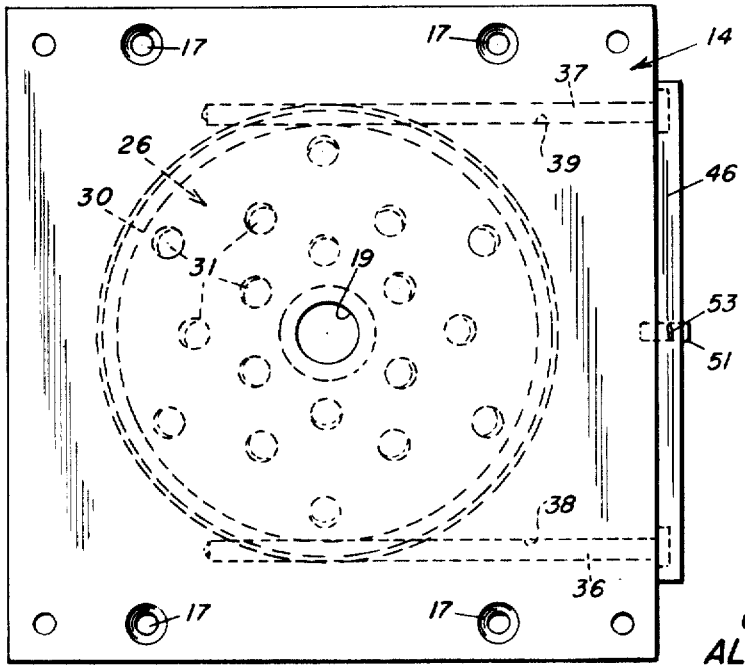
FIG. 6 is a plan view depicting the elements which maintain the center plates in assembled relationship.

An assembly embodying the present invention includes a body center place 14 which may be attached in a suitable manner to the sill structure. In the embodiment illustrated in the drawings the body center plate 14 is secured to the center post structure by bolts 16 or it may be riveted to the underframe of the railway vehicle. The body center plate 14 when viewed in plan is of rectangular formation as shown in FIG. 6 and opening 17 are provided therethrough for accommodating rivets or bolts. The body center plate is provided with a cavity 18 in the underface thereof as shown in FIG. 1. An opening 19 at the center of the cavity 18 is adapted to receive the lower end portion of the king pin. The roof of the cavity is of frusto-conical shape as indicated at 21 (FIG. 4) and a cylindrical shaped surface 22 defines the perimeter of the cavity.

The assembly includes a truck center plate 26 which is adapted to be secured to or formed integral with the bolster 27. The upper portion of the truck center plate forms a projection in contrast to a recess that has been employed in the past for receiving the depending male portion on the body center plate. The truck center plate 26 has a vertically disposed opening 28 for receiving the king pin. The uppermost surface 29 (FIG. 1) of the truck center plate 26 is a frusto-conical formation which tapers or slopes at an angle with respect to the horizontal corresponding to the frusto-conical surface 21, which forms the roof of the cavity 18. A plurality of recesses 31 are formed in the truck center plate 26 and these recesses may be generally of cylindrical shape and with their axes disposed at right angles to the inclined surface 29. The recesses 31 are spaced from each other and are adapted to receive lubricating material of any suitable type such as graphite elements. An annular groove 30 is provided in the periphery of the center plate 26.

Figure 5:
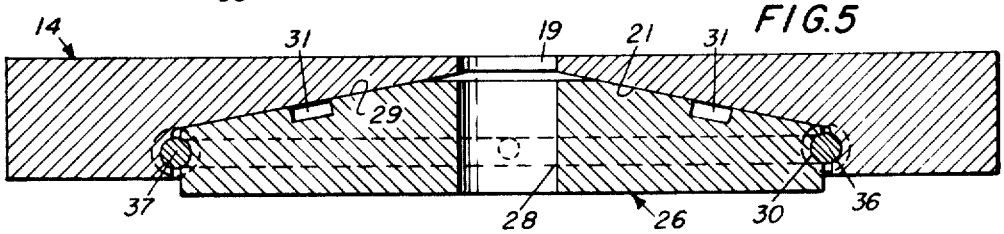
FIG. 5 is a sectional view taken on the line 5—5 of FIG. 4.

The center plate assembly includes means for detachably securing the body center plate and the truck center plate in assembled relation. Such means in the embodiment disclosed takes the form of two rods 36 and 37. The rod 36 is adapted to be inserted in a hole 38 formed in the body center plate 14 and the rod 37 is adapted to be inserted in a hole 39. The holes 38 and 39 are so disposed that a portion of the rod 36 projects laterally from the generally cylindrical surface 22 and is accommodated in the groove 30. A portion of the rod 37 projects laterally from a diametrically opposite portion of the cylindrical surface 22, and is accommodated in the groove 30. When the rods 36 and 37 are in position as shown in FIIG. 6, portions of these rods are accommodated in the groove 30 as shown in FIG. 5. Thus, the center plates are maintained in assembled relationship.

The rods 36 and 37 may be secured in position by a bar 46 which overlies the outer ends of these rods. The bar 46 is equipped with recesses 47 and 48 (FIG. 1) which accommodate the heads of the rods. A stud 51 projects from an edge of the body center plate 14 and extends through an opening 52 in the bar 46. A cotter key 53 or the like extends through an opening in the bar 46 and an opening in the stud 51 to detachably retain the bar in position maintaining the rods in position holding the center plates in assembled relationship.

When abrasion or wear occurs on the mating conical surfaces, there is corresponding wear of the lubricating material stored in the recesses 31. The released lubricating material tends to travel downwardly along the tapered surfaces to provide lubrication of the load supporting surfaces and reduce wear. The body center plate 14 covers the load supporting surfaces and forms a shield preventing access of foreign matter to these surfaces. The tapered design insures improved fit at all stages of wear and a minimum of relative movements between the center plates in directions laterally and longitudinally of the center sill structure.

While the invention has been described with regard to one type of body center plate and one type of truck center plate, it will be appreciated that changes may be made in these elements as well as changes in the over-all assembly.

What is claimed and desired to be secured by Letters Patent is:

1. A center plate assembly for a railway vehicle comprising, a body center plate having a cavity in the lower portion thereof open at the lower face of the body center plate, a roof surface within said cavity of frusto-conical formation, a truck center plate having a frusto-conical upper surface complementary to the frusto-conical surface within said cavity, said frusto-conical surfaces forming the load bearing surfaces between said truck center plate and said body center plate, said truck center plate having a plurality of recesses in the frusto-conical upper surface and spaced from each other over said frusto-conical surface for receiving lubricating material, said truck center plate having an opening therethrough at the apex portion of the frusto-conical surface thereof vertically aligned with an opening in the body center plate for receiving a king pin, some of said recesses being positioned adjacent said opening for the king pin whereby lubricating material released from recesses adjacent the apex portion of said truck center plate travels downwardly between the frusto-conical surfaces.

2. A center plate assembly for a railway vehicle according to claim 1 whrein the body center plate is provided with a cylindrical surface defining a perimeter of the cavity below the frusto-conical roof surface, a cylindrical surface on the truck center plate below the frusto-conical surface thereon fitting within the cylindrical surface on the body center plate, said truck center plate having an annular groove in the cylindrical surface thereof, and means carried by the body center plate extending into said groove holding the body center plate in assembled relationship with the truck center plate.

3. A center plate assembly for a railway vehicle comprising, a body center plate having a *downwardly directed* cavity in the lower portion thereof open at the lower face of the body center plate, a roof surface within said cavity of upwardly converging frusto-conical formation, and [a] *an upwardly projecting projecting* truck center plate having a frusto-conical upper surface complementary to the frusto-conical surface within said cavity, *said truck center plate contacting said body center plate only along the roof surface thereof and* said frusto-conical surfaces forming the *entire* load-bearing surfaces between said truck center plate and said body center plate.

4. A center plate assembly as defined in claim 3 wherein said truck center plate has an opening therethrough vertically aligned with an opening *at the apex of the roof surface* in said body center plate for receiving a king pin.

5. A center plate assembly as defined in claim 3 wherein said body center plate is provided with a cylindrical surface defining a perimeter of the cavity below the frusto-conical roof surface, a cylindrical surface on said truck center plate below the frusto-conical surface thereon fitting within, *but in space relationship to*, the cylindrical surface on said body [center] center plate *and in spaced relationship therewith*, said truck center plate having an annular groove in the cylindrical surface thereof, and means carried by said body center plate extending into said groove holding the body center plate in assembled relationship with the truck center plate.

References Cited

The following reference, cited by the Examiner, are of record in the patented file of this patent or the original patent.

UNITED STATES PATENTS

| | | | |
|---|---|---|---|
| 154,063 | 8/1874 | McClelland | 308—136 |
| 1,743,436 | 1/1930 | Davis, et al. | 308—136 |
| 1,895,568 | 1/1933 | Blackhall | 308—137 |
| 370,718 | 9/1887 | Whitney | 308—136 |
| 486,060 | 11/1892 | Bache | 308—136 |
| 472,151 | 4/1892 | Todd et al. | 308—137 |
| 1,653,564 | 12/1927 | Hairley | 308—137 |
| 1,653,564 | 12/1927 | Hawley | 308—137 |

CHARLES J. MYHRE, Primary Examiner

F. SUSKO, Assistant Examiner